US008393484B2

(12) United States Patent
Benedetti et al.

(10) Patent No.: US 8,393,484 B2
(45) Date of Patent: Mar. 12, 2013

(54) CLOSURE FOR A SEALED CONTAINER OF A POURABLE FOOD PRODUCT, AND METHOD OF PRODUCING THEREOF

(75) Inventors: Paolo Benedetti, Modena (IT); Mats Qvarford, Lund (SE); Fabrizio Pucci, Castel Guelfo di Bologna (IT); Fiorenzo Parrinello, Medicina (IT); Alessandro Falzoni, Imola (IT)

(73) Assignee: Tetra Laval Holdings & Finance S.A., Pully (CH)

( * ) Notice: Subject to any disclaimer, the term of this patent is extended or adjusted under 35 U.S.C. 154(b) by 373 days.

(21) Appl. No.: 12/663,234

(22) PCT Filed: Jun. 4, 2008

(86) PCT No.: PCT/EP2008/056946
§ 371 (c)(1),
(2), (4) Date: Jan. 5, 2010

(87) PCT Pub. No.: WO2008/148824
PCT Pub. Date: Dec. 11, 2008

(65) Prior Publication Data
US 2010/0140271 A1  Jun. 10, 2010

(30) Foreign Application Priority Data
Jun. 5, 2007  (EP) .................................. 07109675

(51) Int. Cl.
*B65D 53/00* (2006.01)
*B65D 41/32* (2006.01)
*B29C 65/02* (2006.01)
(52) U.S. Cl. ........ 215/349; 215/253; 215/261; 215/232; 220/266; 220/359.4; 156/73.3
(58) Field of Classification Search ............... 220/359.4, 220/359.3, 359.1, 265, 260, 258.4, 258.3, 220/258.1, 277; 215/261, 232, 349, 341, 215/316, 252, 250, 48, 47, 40, 200; 222/541.6, 222/541.5, 541.1, 566; 264/145; 156/73.3, 156/142, 257; *B65D 41/32, 41/00, 53/00, B65D 1/02*
See application file for complete search history.

(56) References Cited

U.S. PATENT DOCUMENTS 2,016,936 A * 10/1935 Waring .................... 215/232
3,010,596 A * 11/1961 Williams et al. ........... 215/260
(Continued)

FOREIGN PATENT DOCUMENTS
CH  475137 A  7/1969
DE  7625667 U1  2/1977
(Continued)

OTHER PUBLICATIONS

International Search Report issued by the International Searching Authority (European Patent Office) on Sep. 10, 2009 in International Application No. PCT/EP2008/056946.

(Continued)

*Primary Examiner* — Mickey Yu
*Assistant Examiner* — Robert J Hicks
(74) *Attorney, Agent, or Firm* — Buchanan Ingersoll & Rooney PC

(57) ABSTRACT

A closure for a sealed container of a pourable food product includes a pouring spout which has at least a layer of gas- and/or light-barrier material and a pour opening closed by a cover portion on the side opposite to the side facing, in use, the container, and a cap fittable to, and removable from, the pouring spout; the cover portion has a through cut at its periphery and is joined to a top wall of the cap superimposed on the cover portion, so that the cover portion defines a layer of gas- and/or light-barrier material of the cap and can be removed together with the cap from the pouring spout during first unsealing of the closure; a sealant is provided on a given area of the top wall of the cap for cooperating with a region of the pouring spout.

32 Claims, 3 Drawing Sheets

U.S. PATENT DOCUMENTS

| | | | |
|---|---|---|---|
| 3,263,850 A * | 8/1966 | Scott | 215/261 |
| 4,434,904 A * | 3/1984 | D'Amico et al. | 215/232 |
| 4,501,371 A * | 2/1985 | Smalley | 215/232 |
| 4,585,135 A * | 4/1986 | Sinnott | 215/329 |
| 4,588,099 A * | 5/1986 | Diez | 215/232 |
| 4,818,577 A * | 4/1989 | Ou-Yang | 428/36.5 |
| 4,913,307 A | 4/1990 | Takata et al. | |
| 5,052,568 A * | 10/1991 | Simon | 215/250 |
| 5,564,603 A | 10/1996 | Malmberg | |
| 6,056,141 A * | 5/2000 | Navarini et al. | 220/269 |
| 6,142,334 A | 11/2000 | Kristensson | |
| 6,277,478 B1 | 8/2001 | Kurita et al. | |
| 6,286,702 B1 * | 9/2001 | Buermann | 220/229 |
| 6,527,132 B1 * | 3/2003 | Druitt et al. | 215/341 |
| 2002/0027122 A1* | 3/2002 | Herrera | 215/253 |
| 2005/0001355 A1 | 1/2005 | Gustafsson et al. | |
| 2007/0125785 A1* | 6/2007 | Robinson et al. | 220/351 |

FOREIGN PATENT DOCUMENTS

| | | |
|---|---|---|
| DE | 44 32 718 A1 | 3/1996 |
| EP | 388769 A1 * | 9/1990 |
| EP | 552086 A1 * | 7/1993 |
| EP | 0 648 679 A1 | 4/1995 |
| EP | 0 915 027 A1 | 5/1999 |
| EP | 0 965 531 A1 | 12/1999 |
| EP | 1 147 990 A2 | 10/2001 |
| EP | 1 197 438 B1 | 3/2004 |
| JP | S47-037896 Y | 11/1972 |
| JP | S50-036026 Y | 10/1975 |
| JP | S58-171353 A | 10/1983 |
| JP | S61-132249 U | 8/1986 |
| JP | H06-122465 A | 5/1994 |
| JP | H11-130127 A | 5/1999 |
| JP | 2001-055259 A | 2/2001 |
| WO | WO 03/061940 A1 | 7/2003 |
| WO | WO 2005/044538 A1 | 5/2005 |

OTHER PUBLICATIONS

Written Opinion issued by the International Searching Authority (European Patent Office) on Sep. 10, 2009 in International Application No. PCT/EP2008/056946.

International Preliminary Report on Patentability completed by the International Preliminary Examining Authority (European Patent Office) on Jul. 30, 2009 in International Application No. PCT/EP2008/056946.

Japanese Office Action dated Oct. 30, 2012 issued in the corresponding Japanese Patent Application No. 2010-510794 and English-language translation.

* cited by examiner

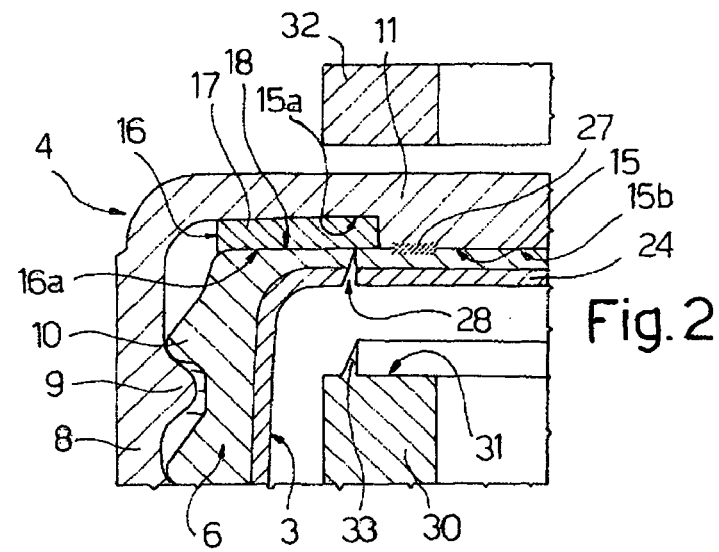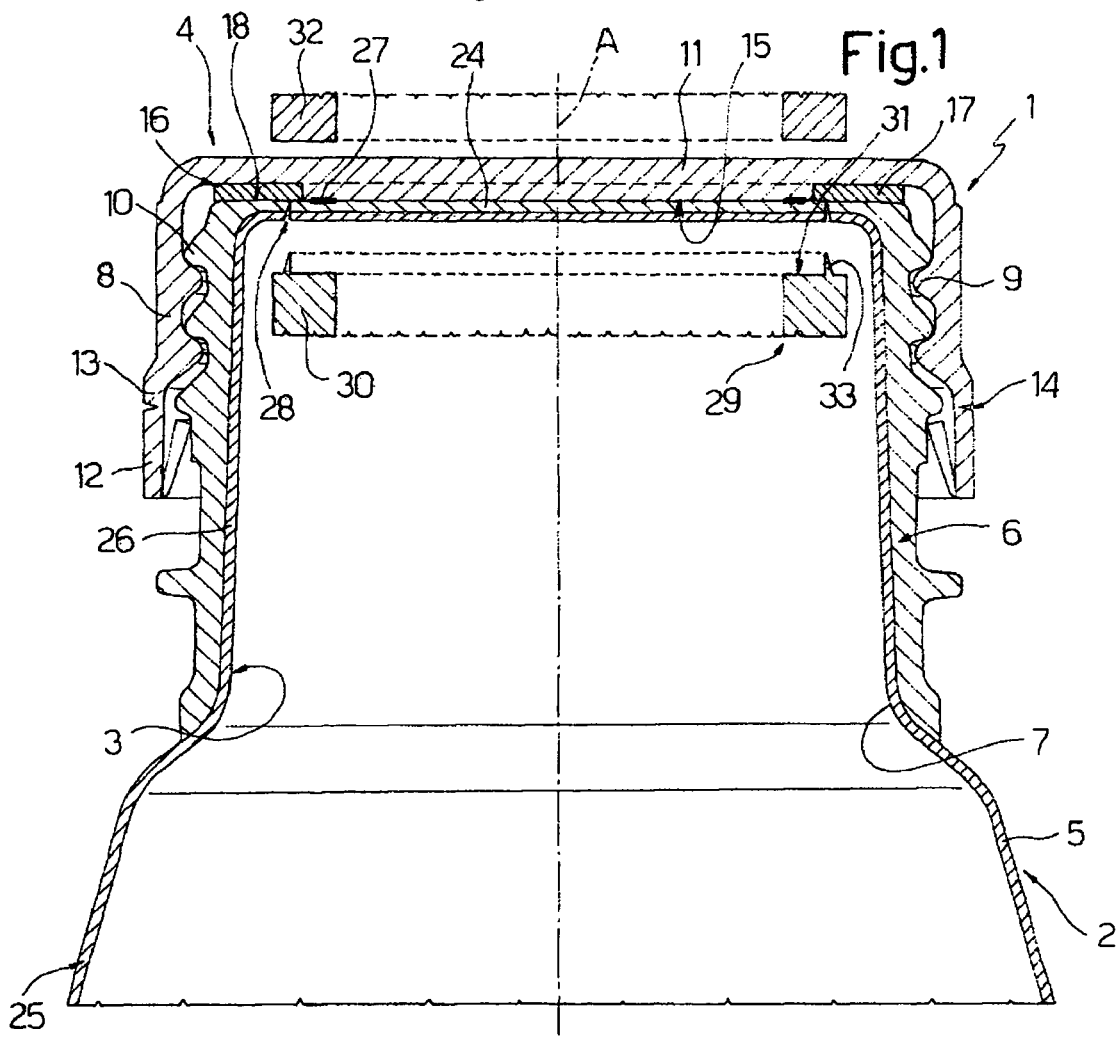

CLOSURE FOR A SEALED CONTAINER OF A POURABLE FOOD PRODUCT, AND METHOD OF PRODUCING THEREOF

TECHNICAL FIELD

The present invention relates to a closure for a sealed container of a pourable food product, and to a method of producing thereof.

BACKGROUND ART

As it is known, many pourable food products, such as fruit juice, milk, tomato sauce, and beverages in general, are sold in a wide range of containers of different types and sizes, such as: parallelepiped-shaped packages made of multilayer, plastic- and/or paper-based, laminated materials or so-called multilayer cardboard materials; beaker-shaped plastic packages; blow-molded bottles; or glass, sheet metal or aluminium containers.

All these containers are fitted with closures which can be opened to allow access by the consumer to the food product, either to pour it into a drinking vessel or consume it straight from the container.

Screw cap closures are commonly used on bottle-type containers, whereas containers made of multilayer cardboard materials are often simply provided with tear-off markers, or with pour openings formed in the containers and covered with pull tabs.

Containers made of multilayer cardboard materials are also known to be fitted with plastic closures injection molded directly onto the containers, about openings formed through the packaging material, so as to completely close and seal the openings. Closures of this sort normally define the pour opening of the container, which may be fitted, for example, with a screw or snap cap.

Injection molded closures may of course be of various sizes and even define the whole top of the container, as in the case of the container known by the registered trademark "Tetra Top", and the top of which is illustrated in Patent Application EP-A-0965531.

Though permitting precise, high-quality forming, injection molding container tops does not allow for integrating a layer of gas-barrier material in the tops, as required, for example, when packaging vitamin-supplemented fruit juice.

As described, for example, in Patent EP-B-1197438 and Patent Application WO 03/061940, plastic tops of containers are also known to be produced by blowing a plastic tubular preform, which may include a layer of gas- and also light-barrier material.

The container known by the trademark "Tetra Aptiva" is one example of a container produced using this technique, i.e. having a main bottom portion made of multilayer cardboard material, and a top, for pouring the liquid or pourable product in the container, produced by blowing a plastic tubular preform.

This technique provides for a high degree of forming precision, especially as regards the pour opening, but has the drawback of requiring the use of special-purpose equipment.

To produce plastic tops or closures to be applied to the container portion of multilayer cardboard material, a method has recently been devised comprising thermoforming and injection molding operations, but no blowing.

One example of this method is described in Patent Application WO 2005/044538, and comprises the step of thermoforming a sheet body of multilayer plastic material having a layer of gas-barrier material, e.g. EVOH. The body is defined integrally by an annular base portion, which is eventually fitted to the cardboard bottom portion of the container, and by a cylindrical neck portion projecting from the inner edge of the base portion and defining, with the base portion, a pour opening by which to pour out the food product. Since thermoforming is performed starting from a sheet of plastic material, the neck portion is closed at its side opposite to the base portion. A protective outer layer of plastic material, with a lateral thread to screw on a cap, is injection molded onto the sheet body so as to form a pouring spout for the container.

After the above operations, and before applying the cap, the material closing the pour opening is removed.

In order to achieve a gas-tight closure of the resulting pouring spout after filling the container, an aluminum foil is welded to the top edge of the spout. After this operation, the cap is finally screwed on the pouring spout.

The above method of producing plastic tops or closures for combined cardboard-plastic containers mainly has the drawback of involving a good deal of time, work, and waste in costly material.

In fact, the portion of material closing the pour opening after the thermoforming operation, and which is removed before applying the cap, normally amounts to about 15-20% of the starting material and, in addition, has a considerable cost as, differently from commonly used plastic materials such as polyethylene or polypropylene, it contains a gas-barrier layer.

Moreover, the aluminum foil welded to the top edge of the pouring spout to achieve a gas-tight closure constitutes a costly additional member, which must be produced and fitted to the spout before the cap is applied to the container.

Furthermore, the resulting closure requires an annoying two-steps operation by the user to obtain the first unsealing. In fact, it is necessary first to unscrew the cap from the pouring spout and then to tear off the aluminum foil covering the spout to reach the content.

DISCLOSURE OF INVENTION

It is an object of the present invention to provide a closure for a sealed container of a pourable food product, which is designed to eliminate the aforementioned drawbacks in a straightforward and low-cost manner.

It is another object of the present invention to provide a closure for a sealed container of a pourable food product, which is capable of ensuring an effective gas- and/or light-barrier and allows to reduce the waste in costly material during its producing process as well as to obtain the first unsealing in a reliable and easy way through a single-step operation and with reduced effort by the user.

At least one of these objects is achieved by a closure for a sealed container of a pourable food product, as claimed in claim 1 or 26.

The present invention also relates to a method of producing a closure for a sealed container of a pourable food product, as claimed in claim 11 or 23.

BRIEF DESCRIPTION OF THE DRAWINGS

A number of preferred, non-limiting embodiments of the present invention will be described by way of example with reference to the accompanying drawings, in which:

FIG. 1 shows a vertical section of a closure, in accordance with the present invention, for a sealed container of a pourable food product;

FIG. 2 shows a larger-scale vertical section of a detail of FIG. 1;

BEST MODE FOR CARRYING OUT THE INVENTION

Figure 4:
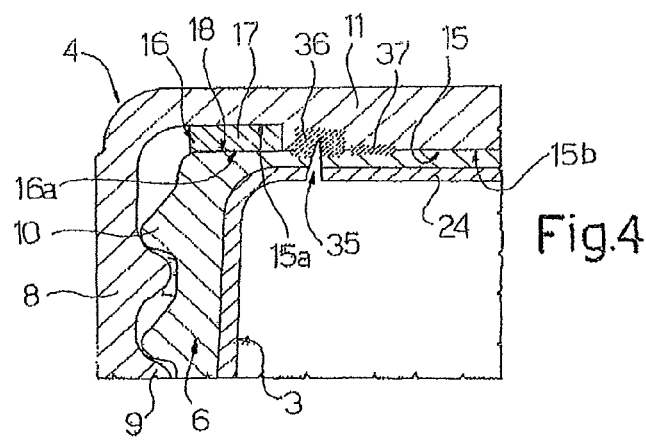
FIG. 4 shows a larger-scale vertical section of a detail of FIG. 3.

Number 1 in FIG. 1 indicates as a whole a closure for a container (not shown) of liquid or pourable food products, such as a plastic closure for a combined cardboard-plastic container—to which the following description refers purely by way of example.

Closure 1 has a longitudinal axis A and basically comprises a pouring spout 2, having at least a layer of gas- and/or light-barrier material, e.g. EVOH, and defining a pour opening 3, by which to pour the food product out of the container, and a cylindrical cap 4 fitted to pouring spout 2 in a removable way.

More specifically, pouring spout 2 comprises an annular base portion 5, which, in the example shown, is concave inwards of the container, and a substantially cylindrical tubular neck portion 6, which projects from an inner radial edge 7 of base portion 5, and defines, with base portion 5, pour opening 3.

According to a possible alternative not shown, the base portion of pouring spout 2 may be also configured to define a complete top or end wall of the container.

Cap 4 is produced in a single piece and is substantially defined by a cylindrical lateral wall 8, which has an internal thread 9, with one or more starts, for engaging a corresponding thread 10 provided on an outer lateral surface of neck portion 6, and by a disk-shaped top wall 11 for covering, in use, the top of pouring spout 2.

In an alternative embodiment not shown, lateral wall 8 of cap 4 may be internally provided with a plurality of cam projections suitable for engaging corresponding projections on neck portion 6.

Cap 4 is molded integrally, in the usual way, with a respective tamperproof ring 12 connected coaxially to a bottom edge 13 of lateral wall 8 by breakable connecting means 14, such as one annular breakable bridge or a number of radial breakable bridges.

Cap 4 is fitted initially to pouring spout 2 in a completely closed or sealed position (FIG. 1), wherein the cap is screwed completely onto neck portion 6, with bottom edge 13 and tamperproof ring 12 still connected to each other and resting on opposite sides of a bottom portion of thread 10 of neck portion 6 or an annular rib extending on the neck portion at a lower position than thread 10 with respect to axis A.

Once unsealed, cap 4 is movable between an open position, in which it is unscrewed off pouring spout 2, and a closed-again position, in which it is again completely screwed on the pouring spout and reseals pour opening 3.

In order to perform the sealing function in both the closed positions of cap 4, as it will be explained in greater detail below, a bottom surface 15 of top wall 11 of the cap, i.e. the surface facing in use pouring spout 2, is provided with a sealant 16, made of a polymeric or elastomeric material, for cooperating with an upper edge 18 of neck portion 6.

In particular, as shown in FIGS. 1 and 2, sealant 16 essentially comprises an annular portion 17 adhering to an external annular region of top wall 11 of cap 4; more specifically, annular portion 17 of sealant 16 is housed within an annular peripheral depression 15a of surface 15 of top wall 11 so that a bottom surface 16a of such portion of the sealant is flush with the remaining internal portion 15b of the surface 15.

Figure 6:
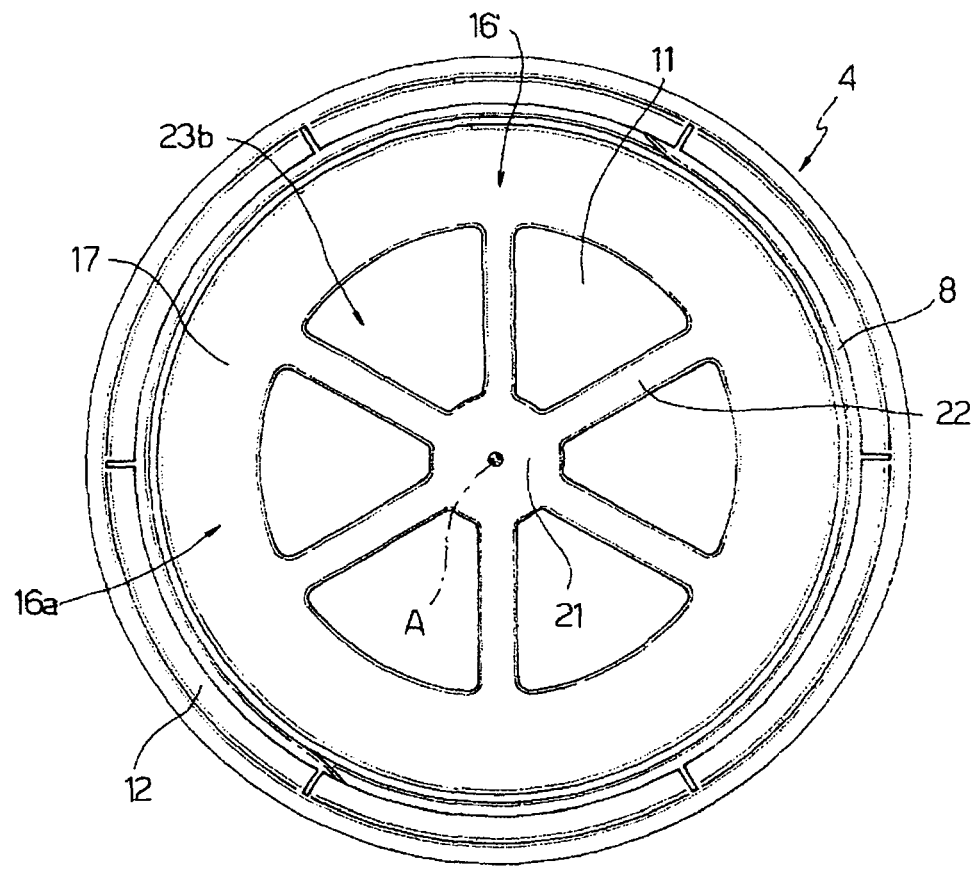
FIG. 6 shows a bottom view of the FIG. 5 cap.
Figure 5:
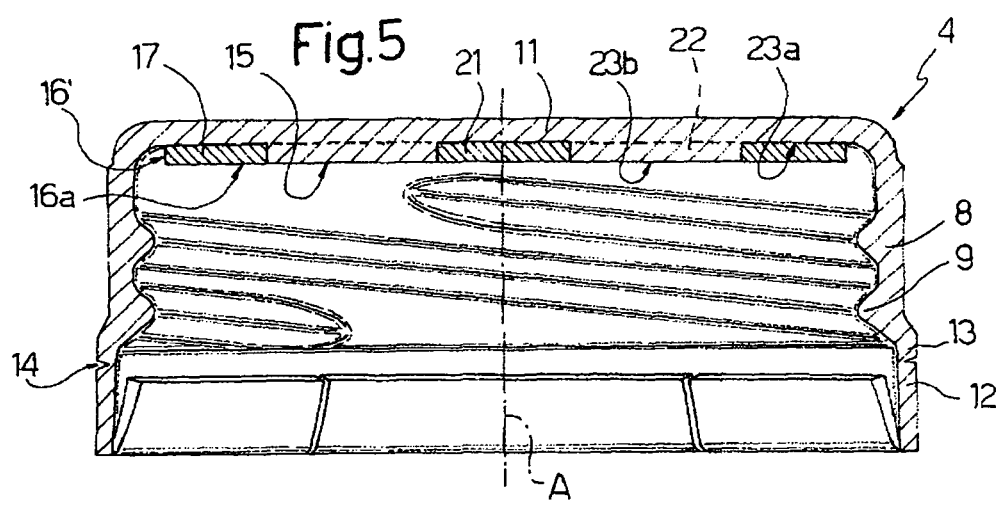
FIG. 5 shows a larger-scale vertical section of a possible variant of a cap of the closures of FIGS. 1 and 3.

The variant of FIGS. 5 and 6 relates to a possible different configuration of the sealant, made in accordance with the teachings of the present invention and indicated hereafter with 16'; sealant 16' is described below only insofar as it differs from sealant 16, and using the same reference numbers for component parts corresponding or equivalent to those already described.

In particular, sealant 16' comprises an external annular portion 17 for cooperating in use with upper edge 18 of neck portion 6, an internal substantially circle-shaped portion 21, which is concentric in relation to the external annular portion 17, and a number of radial bridge elements 22 connecting the two portions 17, 21.

In the example shown, bridge elements 22 are six in number and are angularly equidistant, i.e. arranged at an angular distance of 60° from one another.

Also in this case, sealant 16' is housed within a complementary peripheral depression 23a of surface 15 of top wall 11 so that a bottom surface 16a of the sealant is flush with the remaining portion 23b of the surface 15.

Sealant 16, 16' can be formed by compression-moulding of a dose of polymeric or elastomeric material in fluid or semi-fluid state, which is deposited directly inside cap 4 in a known way.

Closure 1 is produced according to the method described below.

Firstly, pouring spout 2 is produced in a closed configuration, in which a disk-shaped cover portion 24, integral with neck portion 6, closes pour opening 3 on the side of neck portion 6 opposite to the side facing, in use, the container.

More specifically, pouring spout 2 is produced through a series of operations starting from a forming operation, preferably a thermoforming or hot forming operation, performed on a multilayer plastic sheet material comprising a layer of gas- and/or light-barrier material, e.g. EVOH.

The forming operation produces a hollow, substantially hat-shaped body 25, which is open on the side facing the container to which it is eventually attached, and is closed on the opposite side.

More specifically, body 25 comprises an annular bottom portion integrally defining base portion 5, and an inverted cylindrical cup-shaped top portion 26 projecting axially from the inner radial edge of the bottom portion. Top portion 26 has a lateral wall defining the inner side of neck portion 6, and therefore laterally bounding pour opening 3, and a disk-shaped top wall closing pour opening 3.

Alternatively, body 25 may be produced by other suitable forming techniques, such as compression or injection molding.

Body 25 may be also produced from a plastic material having no gas- and/or light-barrier property, and a layer of gas- and/or light-barrier material may be provided by a surface coating.

Next, plastic material, such as polyethylene or polypropylene, is overmoulded by compression onto the outer side of top portion 26 of body 25 to form thread 10 and other neck features so as to impart sufficient thickness and rigidity to those parts.

All these operations permit to obtain pouring spout 2 in the configuration shown in FIG. 1.

When forming of pouring spout 2 is obtained by compression or injection molding, the overmoulding step is not necessary; in fact, compression or injection molding allow forming, in a single step, body 25 and all neck features, such as thread 10.

As a result of the described operations, neck portion 6 and cover portion 24 define integral parts of pouring spout 2, in the sense that they derive from forming operations only, without any necessity of joining them through welding or gluing.

At the same time, cap 4 is formed and sealant 16, 16' is applied to top wall 11 of cap 4 through known techniques.

At this point, cap 4 is fitted to pouring spout 2, so that threads 9 and 10 engage mutually, and top wall 11 of cap 4, provided with sealant 16, 16', is positioned adjacent to, or rather superimposed on, cover portion 24 of the pouring spout.

In particular, in this condition, surface 16a of sealant 16, 16' and portion 15b of surface 15 of top wall 11 of cap 4 abut the upper surface of pouring spout 2, i.e. the upper surface of cover portion 24 and the upper edge 18 of neck portion 6.

After this assembly operation, top wall 11 of cap 4, at the portion 15b of its bottom surface 15, and cover portion 24, at its peripheral region, are joined, e.g. by welding. In particular, in the example shown, top wall 11 and cover portion 24 are heat sealed to form an annular weld 27.

In addition, an annular cut 28 is also produced along the periphery of cover portion 24 and on the side thereof facing pour opening 3 or facing away from top wall 11 of cap 4, in order to ease removal of the cover portion from neck portion 6 during first unsealing of closure 1, as it will be explained in greater detail below.

In the example shown in FIGS. 1 and 2, the cutting operation is made all through cover portion 24 and against annular portion 17 of sealant 16, 16' so as to guarantee sealing of closure 1.

In practice, the operation of joining is performed at a region radially interposed between annular portion of sealant 16, 16' and axis A so as to join cover portion 24 to portion 15b of surface 15 of top wall 11; in other words, the operation of joining is performed at a region of cover portion 24 which is inner compared to cut 28 with reference to axis A and pour opening 3.

The cutting operation can be performed, for instance, by a cold or hot blade or by ultrasonic or laser devices.

In the example shown in FIGS. 1 and 2, the welding and cutting operations are performed simultaneously by a ultrasonic device 29; it substantially comprises a substantially cylindrical tubular pressure member 30, provided with an annular work surface 31 cooperating with top wall of body 25 and an ultrasound generating unit (not shown); a backing member 32 cooperating with top wall 11 of cap 4 on the opposite side to pressure member 30, and guide means (not shown) for moving pressure member 30 to and from backing member 32 to obtain the desired compression force during ultrasound generation.

The periphery of pressure member 30 may be fitted with an annular cutting member 33 which acts on cover portion 24 to make cut 28.

Figure 3:
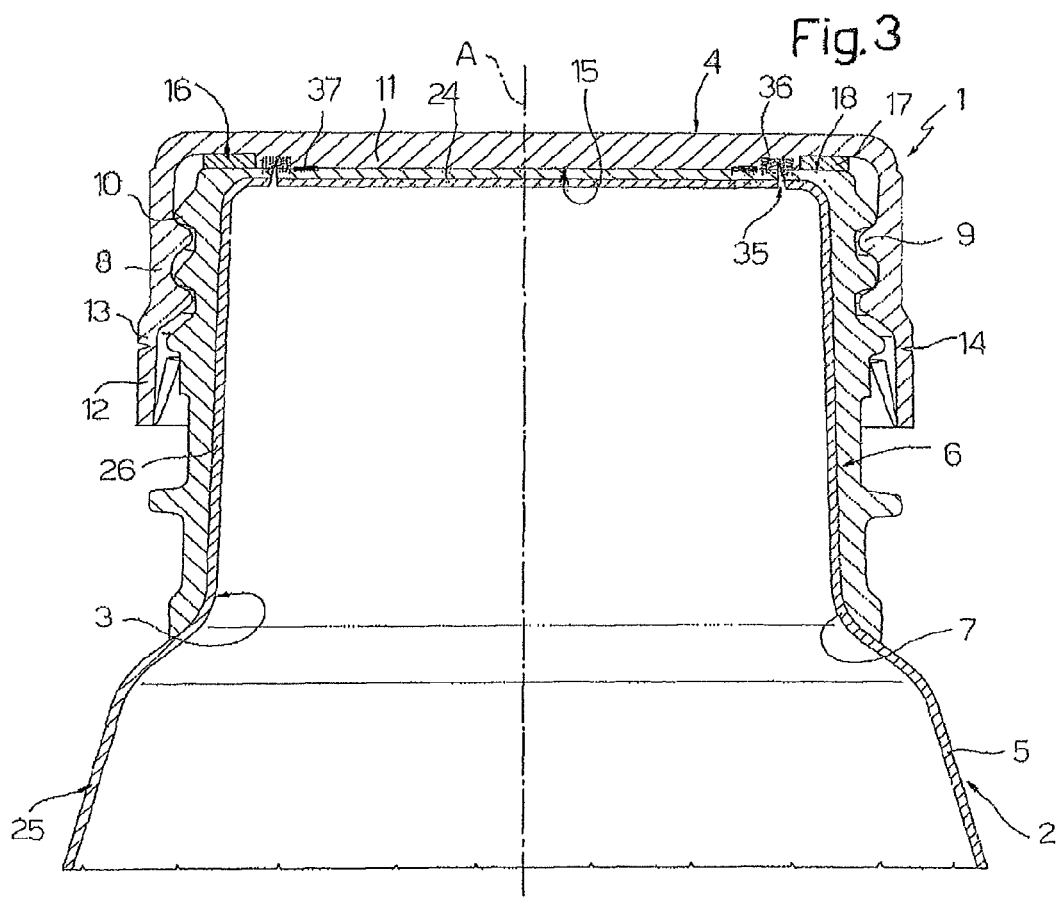
FIG. 3 shows another embodiment of the FIG. 1 closure in accordance with the present invention.

According to the variant shown in FIGS. 3 and 4, the cutting operation is performed:

in a hot state, e.g. by using ultrasonic or laser devices, hot tools, etc.;
all through the periphery of cover portion 24; and
against portion 15b of surface 15 of top wall 11 of cap 4 or partly through such top wall 11, i.e. at a region radially interposed between annular portion 17 of sealant 16, 16' and axis A.

In this way, it is possible to obtain a complete cut 35 of the material under top wall 11 of cap 4 and a weld 36 around the cutting zone and between cover portion 24 and the top wall of the cap (briefly indicated hereafter as a "cut and weld" operation). In practice, due to the melting effect on the material around the cutting zone, the weakening operation produces a simultaneous joining of the overlap parts in such zone.

An additional welding operation between cover portion 24 and top wall 11 of cap 4 may be also performed at a region radially interposed between weld 36 and axis A to produce a further annular weld 37, which allows to tighten security that cover portion 24 remains attached to cap 4 even after first unsealing of closure 1.

The embodiment shown in FIGS. 3 and 4 may also ensure sealing of closure 1 before first use even in the case that cap 4 is lacking in sealant 16, 16'; in this case, sealant 16, 16' acts for guaranteeing resealing of closure 1 after first unsealing and a sort of "extra security".

At the end of the above-described operations, cover portion 24 defines a layer of gas- and/or light-barrier material of cap 4, i.e. a "liner", as this layer is commonly referred to in the packaging of pourable food products.

It is pointed out that the cut and weld operation could be also performed on a pouring spout lacking in a layer of gas- and/or light-barrier material and/or lacking in a cover portion closing pour opening 3; in this latter case, the cut and weld operation may produce a weld between the upper region of the neck portion and cap 4.

First unsealing of the container is obtained in a single step by unscrewing cap 4 off pouring spout 2.

As cap 4 is turned about axis A anticlockwise in FIGS. 1 and 3, mating threads 9 and 10 simultaneously move cap 4 axially away from pouring spout 2 so as to break connecting means 14 and starting removal of cover portion 24 from pour opening 3; as a result of this turning action, tamperproof ring 12 is retained resting axially against the bottom portion of thread 10 of neck portion 6 and cap 4 and cover portion 24 are completely detached from pouring spout 2 so freeing pour opening 3; by virtue of weld 27 or welds 36 and 37, cover portion 24 remains joined to cap 4 as opposed to being discarded.

The container can be closed again by simply fitting cap 4 back onto pouring spout 2. In this condition, the resealing of closure 1 is ensured by cooperation of annular portion 17 of sealant 16, 16' with upper edge 18 of neck portion 6 under the pressure exerted by cap 4 on pouring spout 2 in the closed-again position.

The advantages of closure 1 and the method of producing thereof will be clear from the foregoing description.

In particular, thanks to the fact that the gas- and/or light-barrier material sealing pouring spout 2 is defined by cover portion 24, which is simply obtained through the forming operation for producing the spout, any waste in costly material is eliminated. In fact, in this case, cover portion 24 is simply welded to top wall 11 of cap 4 in order to be then removed from the spout during the first unsealing of the container, instead of being first removed at the end of the forming process of the pouring spout and then replaced by an additional costly gas- and/or light-barrier member welded to the spout and which needs to be removed again at the first use.

Moreover, the first unsealing of closure 1 can be achieved by the user through a single-step operation, i.e. by simply unscrewing cap 4 off pouring spout 2.

Furthermore, thanks to the fact that cut 28, 35 extends at least all through cover portion 24, the removal of such portion from pouring spout 2 during first unsealing of closure 1 requires a really low torque effort by the user on cap 4.

In the embodiment of FIGS. 1 and 2, the sealing of the closure until the container reaches the final user and the resealing of such closure after first unsealing are both guaranteed by sealant 16, 16'.

In the solution of FIGS. 3 and 4, a heat sealing between cover portion 24 and top wall 11 of cap 4 is achieved all around the cutting zone, so rendering sealant 16, 16' needless for ensuring sealing of closure 1 until the container reaches the final user; in this case, sealant 16, 16' only acts for guaranteeing resealing of the closure and "extra security".

Clearly, changes may be made to closure 1 and to the method as described and illustrated herein without, however, departing from the scope as defined in the accompanying claims.

The invention claimed is:

1. A closure for a sealed container of a pourable food product, said closure comprising:
    a pouring spout comprising a neck portion to define a pour opening and a cover portion closing the pour opening on the side of said neck portion opposite to the side facing, in use, the container; and
    a cap fittable to, and removable from, the pouring spout;
    said cover portion having a cut at its periphery and being joined to a top wall of the cap superimposed on the cover portion;
    said cut is a through cut so that said cover portion is removable together with said cap from the pouring spout during first unsealing of the closure; and in that a sealant is provided on a given area of the top wall of the cap for cooperating with a region of the pouring spout around the cover portion to ensure sealing of the closure.

2. A closure as claimed in claim 1, wherein the sealant comprises at least one annular portion applied on the periphery of the top wall of the cap.

3. A closure as claimed in claim 2, wherein the sealant comprises a central portion, which is concentric and internal in relation to the annular portion, and a number of bridge elements connecting said annular and central portions.

4. A closure as claimed in claim 1, wherein said cut is interposed between an annular portion of the sealant and an axis of said annular portion.

5. A closure as claimed in claim 4, wherein said cut extends partly through the top wall of the cap.

6. A closure as claimed in claim 4, wherein the join between the cover portion and the top wall of the cap is located around the cut.

7. A closure as claimed in claim 4, wherein the cover portion and the top wall of the cap are joined at a further region interposed between said cut and the axis of the annular portion.

8. A closure as claimed in claim 1, wherein said cut extends against an annular portion of the sealant.

9. A closure as claimed in claim 8, wherein the join between the cover portion and the top wall of the cap is interposed between the annular portion of the sealant and an axis of said annular portion.

10. A closure as claimed in claim 1, wherein the neck portion of the pouring spout has a thread for engaging a corresponding thread of the cap.

11. A method of producing a closure for a sealed container of a pourable food product, said method comprising:
    forming a pouring spout comprising a neck portion to define a pour opening and a cover portion closing the pour opening on the side of said neck portion opposite to the side facing, in use, the container;
    forming a cap to be fitted to the pouring spout in a removable way;
    making a cut at the periphery of the cover portion;
    joining the cover portion to a top wall of the cap superimposed on the cover portion;
    said making of the cut comprising making a through cut into said cover portion so that said cover portion is removable together with said cap from the pouring spout during first unsealing of the closure; and
    applying a sealant on a given area of the top wall of the cap for cooperating with a region of the pouring spout around the cover portion to ensure sealing of the closure.

12. A method as claimed in claim 11, wherein said applying of the sealant is performed before said cap is fitted to the pouring spout;
    and said making of the cut and said joining are performed after said cap is fitted to said pouring spout and on the side of the cover portion facing away from the cap.

13. A method as claimed in claim 11, wherein the sealant comprises at least one annular portion applied on the periphery of the top wall of the cap.

14. A method as claimed in claim 11, wherein said steps of making a cut and joining are performed simultaneously.

15. A method as claimed in claim 11, wherein said step of joining is a result of said step of making a cut performed in a hot state so as to produce a weld around the cutting zone.

16. A method as claimed in claim 15, wherein said step of making a cut in a hot state is performed at a region of said cover portion interposed between the annular portion of the sealant and an axis of said annular portion.

17. A method as claimed in claim 15, wherein said step of making a cut in a hot state is performed all through the cover portion and partly through the top wall of the cap.

18. A method as claimed in claim 15, further comprising joining the cover portion and the top wall of the cap at a region interposed between said weld and the axis of the annular portion.

19. A method as claimed in claim 11, wherein said cut extends against said annular portion of the sealant.

20. A method as claimed in claim 19, wherein said joining is performed at a region interposed between the annular portion of the sealant and an axis of said annular portion.

21. A method as claimed in claim 11, wherein said joining is welding.

22. A method as claimed in claim 11, wherein said forming of the pouring spout comprises forming a thread on said pouring spout for engaging a corresponding thread of the cap.

23. A method of producing a closure for a sealed container of a pourable food product, said method comprising:
    forming a pouring spout having a neck portion to define a pour opening and a cover portion closing the pour opening on the side of said neck portion opposite to the side facing, in use, the container;
    fitting a removable cap to the pouring spout;
    subsequently making an annular cut along the periphery of the cover portion and on the side facing away from the cap; and
    said making of the cut is performed in a hot state and produces a complete cut of at least the cover portion and a weld of said cover portion to a superimposed top wall of the cap around the cutting zone, so that said cover portion can be removed from the pouring spout together with said cap during first unsealing of the closure.

24. A method as claimed in claim 23, wherein the pouring spout comprises at least a layer of gas- and/or light-barrier material.

25. A method as claimed in claim 23, wherein said step of making a cut is performed also partly through the top wall of the cap.

26. A closure for a sealed container of a pourable food product, said closure comprising:

a pouring spout having a neck portion to define a pour opening and a cover portion closing the pour opening on the side of said neck portion opposite to the side facing, in use, the container;

a cap fittable to, and removable from, the pouring spout;

an annular cut produced along the periphery of the cover portion and on the side facing away from the cap;

said cut being complete, extending at least all through the cover portion and being performed in a hot state; and said cover portion being welded to a superimposed top wall of the cap around the cut so that said cover portion is removable from the pouring spout together with said cap during first unsealing of the closure; and said weld being made as a result of performing said annular cut.

27. A closure as claimed in claim 26, wherein the pouring spout comprises at least a layer of gas- and/or light-barrier material.

28. A closure as claimed in claim 26, wherein said cut extends also partly through the top wall of the cap.

29. A closure as claimed in claim 1, wherein the pouring spout comprises at least a layer of gas- and/or light-barrier material.

30. A closure as claimed in claim 29, wherein the through cut passes through the layer of gas- and/or light-barrier material.

31. A method as claimed in claim 11, wherein the pouring spout comprises at least a layer of gas- and/or light-barrier material.

32. A method as claimed in claim 31, wherein the making of the through cut comprises making the through cut so the through cut passes through the layer of gas- and/or light-barrier material.

* * * * *